US007754129B2

(12) United States Patent
Lach, III et al.

(10) Patent No.: US 7,754,129 B2
(45) Date of Patent: Jul. 13, 2010

(54) SEALING SYSTEM AND PROCESS THEREFOR

(75) Inventors: Theodore M. Lach, III, Downers Grove, IL (US); Peter M. F. Collins, Mokena, IL (US); Mark A. Holm, Joliet, IL (US); Jason R. Prancer, New Lenox, IL (US)

(73) Assignee: Illinois Tool Works Inc., Glenview, IL (US)

( * ) Notice: Subject to any disclaimer, the term of this patent is extended or adjusted under 35 U.S.C. 154(b) by 972 days.

(21) Appl. No.: 11/386,500

(22) Filed: Mar. 22, 2006

(65) Prior Publication Data

US 2006/0172130 A1 Aug. 3, 2006

Related U.S. Application Data

(62) Division of application No. 10/612,091, filed on Jul. 2, 2003, now Pat. No. 7,390,845.

(60) Provisional application No. 60/398,739, filed on Jul. 26, 2002.

(51) Int. Cl.
*B29C 45/14* (2006.01)

(52) U.S. Cl. .................... 264/265; 264/271.1; 264/279

(58) Field of Classification Search ................ 264/265, 264/279, 271.1
See application file for complete search history.

(56) References Cited

U.S. PATENT DOCUMENTS

| | | | | |
|---|---|---|---|---|
| 4,133,796 | A * | 1/1979 | Bullman | 523/438 |
| 4,351,786 | A * | 9/1982 | Mueller | 264/46.7 |
| 6,536,844 | B2 * | 3/2003 | Huse | 297/452.65 |
| 2002/0058122 | A1 * | 5/2002 | Arai et al. | 428/98 |

* cited by examiner

*Primary Examiner*—Richard Crispino
*Assistant Examiner*—Barbara J. Musser
(74) *Attorney, Agent, or Firm*—Mark W. Croll; Paul F. Donovan

(57) ABSTRACT

A sealing element is formed from a desirably shaped body of a sealant material formulated from a first polymer in a concentration of about 25 percent to about 40 percent, an inert filler material in a concentration of about 20 percent to about 45 percent and a hydrocarbon resin in a concentration of about 1 percent to about 15 percent. The sealant material, when positioned about a first component is overmolded with a material forming a second component. The sealant material, which is heat activated, forms a seal between the first and second components.

9 Claims, 1 Drawing Sheet

SEALING SYSTEM AND PROCESS THEREFOR

CROSS-REFERENCE TO RELATED APPLICATION DATA

This application is a division of U.S. patent application Ser. No. 10/612,091 filed Jul. 2, 2003, now U.S. Pat. No. 7,390,845, which claims the benefit of priority of provisional U.S. Patent application Ser. No. 60/398,739, filed Jul. 26, 2002.

BACKGROUND OF THE INVENTION

The invention relates generally to providing a seal between various components, such as a stamping and a resin, and/or two plastic materials, to eliminate leak paths. More particularly the present invention concerns the use of an insert having desirable properties allowing it to be first molded to a desired shape, placed into a combination of parts and then heated to seal those parts together.

There are many applications that require a seal in order to eliminate failure modes. In a connector, for example, a leak path typically exists from one side of the connector to the other side via connector pins (copper, steel or other conductive materials with various platings). Other sealing applications include isolation of the leak path between plastic and metal surfaces, between metal and metal components and/or surfaces, or between plastic and plastic components and/or surfaces of an assembly. One exemplary application concerns automotive components, such as a transmission controller, or a controller for anti-lock brakes and traction control systems.

In a typical connector, a seal is generally not formed between the connector pins and an overmolded plastic part. Although the lack of a seal in and of itself may not be problematic, adverse conditions can be exaggerated and, over time, severe problems can occur due to the lack of a seal. This is particularly so in that metal and plastic components expand and contract at different rates. The variation in expansion and contraction rates can result in large gaps between the materials, resulting in high leak rates. As such, pressurizing one end of the connector assembly can result in pressure escaping through the part and out the other end of the connector.

Accordingly, there is a need for a sealing system that can accommodate variations in expansion and contraction rates of differing materials. Desirably, such a sealing system is moldable to or over a first component (e.g., an electrical conductor) which is then molded into a second component, such as a plastic frame or assembly. Most desirably, such a sealing system adheres well to both the first and second components and exhibits enhanced environmental sealing characteristics.

BRIEF SUMMARY OF THE INVENTION

A sealing element is formed from a desirably shaped body of a sealant material formulated from a first polymer in a concentration of about 25 percent to about 40 percent, an inert filler material in a concentration of about 20 percent to about 45 percent and a hydrocarbon resin in a concentration of about 1 percent to about 15 percent.

The sealant material is positioned about a first component (such as an electrical conductor or lead) and is overmolded with a material forming a second component (such as a plastic or polymer frame). The sealant material, which is heat activated, forms a seal between the conductor and the frame. The seal so formed eliminates leak paths that might otherwise occur between the conductor and the frame. The sealant so formed exhibits exceptional adherence to both the first and second materials, e.g., the conductors and the plastic frame.

A method for forming such a seal is also disclosed. In such a method the sealant material is disposed around a portion of the conductors and the frame is overmolded over the conductors and the sealant. The sealant is activated by the heat of the overmolding.

These and other features and advantages of the present invention will be apparent from the following detailed description, in conjunction with the appended claims.

DETAILED DESCRIPTION OF THE INVENTION

Figure 1:
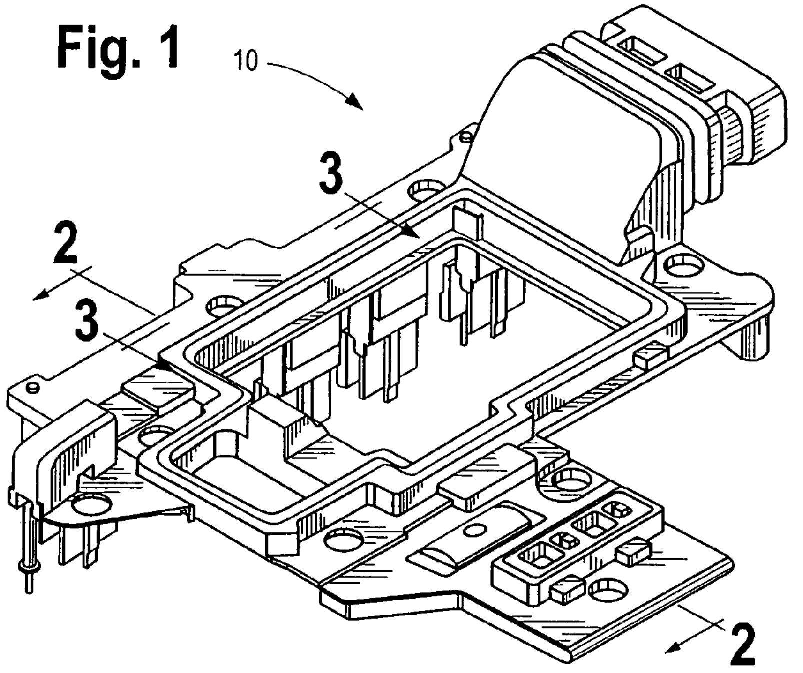
FIG. 1 is a perspective view of an exemplary device having a sealing system formed in accordance with the teachings of the present invention, the exemplary device being an automotive transmission lead frame.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

A sealing system for sealing the juncture of a first component that penetrates a second component accommodates variations in expansion and contraction rates of differing component materials. The sealing system includes a sealant that is moldable to or over the first component (e.g., an electrical conductor) which is then molded into the second component, such as a plastic frame or assembly. The sealant adheres well to both the first and second components and provide an excellent environmental seal. A typical use is in connection with an electrical or electromechanical connector that is used in an environment in which one side of the seal may not be conducive to electrical components such as sensors and the like. Such uses include connectors for automobile transmission controllers, anti-lock brake systems, traction control systems and the like.

A present sealing element is formed from a desirably shaped body of a sealant material that is formulated from a first polymer in a concentration of about 25 percent to about 40 percent, an inert filler material in a concentration of about 20 percent to about 45 percent and a hydrocarbon resin in a concentration of about 1 percent to about 15 percent. The sealant material, when positioned about the first component is overmolded with the material forming the second component. The sealant material forms a seal between the first and second components.

The sealant is a heat reactive moldable polymeric material. In a present embodiment, the sealant is an acrylic based, injection moldable resin. One known resin includes a base material of an ethylene vinyl acetate (EVA) copolymer (CAS No. 24937-78-8) having the molecular formula ($C_4H_6O_2$—

$C_2H_4$)x. The EVA copolymer is present in a concentration of about 25 percent to about 40 percent, and preferably about 25 percent to about 30 percent of the sealant.

A mineral filler is added to the resin. One mineral filler is calcium carbonate in the form of the mineral calcite (i.e., limestone or chalk, CAS No. 1317-65-3). The mineral filler is present in a concentration of about 20 percent to about 45 percent, and preferably about 25 percent to 30 percent of the sealant. The sealant further includes a hydrocarbon resin, such as benzene, (1-methylethylene)-, polymer with 2-methyl-2-butene and 1,3 pentadiene (CAS No. 62258-49-5) having the chemical formula ($C_9H_{10}$—$C_5H_{10}$—$C_5H_8$)x. The hydrocarbon resin is present in a concentration of about 1.0 percent to about 15 percent, and preferably about 10 percent to about 15 percent of the sealant.

A preferred sealant further includes an ethylene polymer in a concentration of about 25 percent to about 35 percent, and preferably about 25 percent to about 30 percent. One polymer is 2-propenoic acid, 2-methyl-, oxiranylmethylester polymer with ethene and methyl 2-propenoate (CAS No. 51541-08-3) having the molecular formula ($C_7H_{10}O_3$—$C_4H_6O_2$—$C_2H_4$) x.

Optionally, the sealant can include an epoxy resin in a concentration of about 2 percent to about 5 percent. One epoxy resin is phenol, 4,4'-(1-methylethylidene)bis-polymer with 2,2'-[(1-methylethylidene)bis(4,1-phenyleneoxymethylene)]bis[oxirane] (CAS No. 25036-25-3), having the chemical formula ($C_{21}H_{24}O_4$—$C_{15}H_{16}O_2$)x. The sealant can also include an acrylic ester such as 2-propenoic acid, 2-(2-ethoxyethoxy) ethyl ester having the chemical formula $C_9H_{16}O_4$ (CAS No. 7328-17-8) and an activator such as peroxide, (3,3,5-trimethylcyclohexylidene)bis [(1,1-dimethylethyl) (also known as Trigonox+so 29, CAS No. 6731-36-8), having the chemical formula $C_{17}H_{34}O_4$ in concentrations of about 2 percent to about 5 percent and less than about 1.0 percent, respectively.

Other optional constituents include an adhesion promoter and carbon black (CAS No. 1333-86-4) an adhesion promoter. An alternate formulation of the sealant excludes the ethylene polymer.

Alternately still, the sealant can include the EVA copolymer in a concentration of about 30 percent to about 40 percent, the mineral filler in a concentration of about 30 percent to about 45 percent, the hydrocarbon resin in a concentration of about 1 percent to about 10 percent. This formulation further includes a wax (CAS No. 64742-42-3) in a concentration of about 1 percent to about 10 percent, rubber (benzene, 1,3-diethenyl-, polymer with 1,3-butadiene and ethenylbenzene, CAS No. 26471-45-4) in a concentration of about 1 percent to about 10 percent, polyolefin (2-propenoic acid, ethyl ester, polymer with ethene and 2,5-furandione, CAS No. 41171-14-6) in a concentration of about 1 percent to about 10 percent, a blowing agent in a concentration of about 1 percent to about 10 percent, a curing agent (peroxide, bis (1-methyl-1-phenylethyl), CAS No. 80-43-3, having the chemical formula $C_{18}H_{22}O_2$) in a concentration of about less than 1 percent and a colorant in a concentration of about less than 1 percent.

As will be appreciated by those skilled in the art, the sealant is formulated to be used in most injection molding processes and readily adheres to plastic, such as nylon, and to non-plastic ferrous and non-ferrous metals. To this end essentially any supporting media can be used as a substrate. The sealant can also be used as a molded in place sealant for bonding plastic, such as nylon, materials to metallic substrates and the like. Thus, the sealant can be used to establish a seal between different materials, which is an important consideration when used in electrical connectors and the like.

The sealant is heat activated during molding or in a secondary environment by applying a thermal heat source, such as an infrared, convection or induction heating oven or the like. Upon heating, the sealant resin will soften and adhere to the over-molded element, and any underlying elements or members, such as electrical conductors to create a tough, durable, stable bond or seal. The sealant may also cross-link further enhancing the structural integrity of the seal.

As set forth above, various formulations have been found to function acceptably for use in connection with the present sealing system. A typical formulation has a specific gravity of about 1.3, a melt point of about 160° F., a cross-linking temperature of between about 250° F. and about 300° F. and a melt index of about 10 to about 50.

Figure 2:
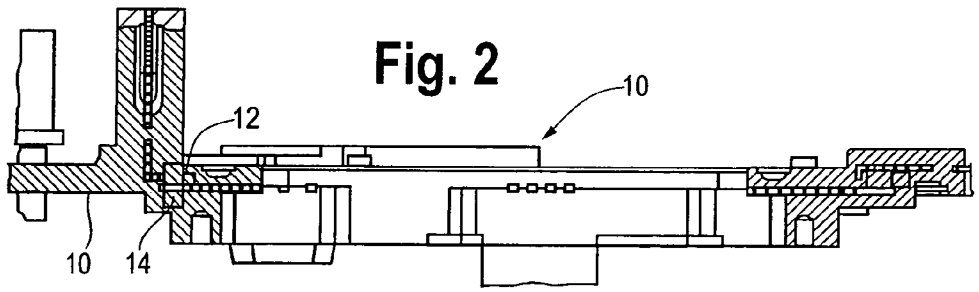
FIG. 2 is cross-sectional view of the lead frame taken along line 2-2 of FIG. 1.
Figure 3:
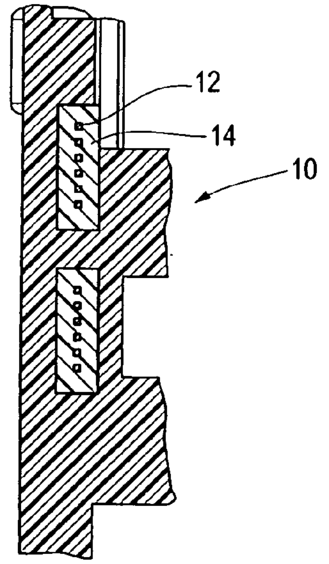
FIG. 3 is a partial cross-sectional view taken along line 3-3 of FIG. 2.

FIGS. 1-3 illustrates one exemplary use for the present sealing system, in which the sealing system is used with an automotive transmission lead frame 10. The frame 10 is formed from a plastic or polymeric material that provides the structure of the frame. As with many such components or assemblies, electrical conductors or leads 12 are required on both sides of the frame 10. Where the frame 10 serves as a barrier or as part of a barrier, the leads 12 must penetrate that barrier. To this end, the area or region at which the leads 12 penetrate the frame 10 (or barrier), must also provide a barrier or seal.

In the present system, the sealant 14 is formed as a premold around the leads or conductors 12. The premold 14 and conductors 12 are then overmolded with the material that forms the frame 10, e.g., the overlying plastic material. In a present arrangement, the overmold fully envelopes or covers the sealant 14. Thus, the overmold overlies the portions of the conductors 12 (with portions of the conductors extending out from the overmold), but fully encloses the sealant 14. One overmold material that is typically used is polybutylene terephthalate (PBT). An alternate overmold material is nylon.

A method for forming a seal includes applying or molding a sealant 14 around a portion of a first or penetrating component or components (e.g., the electrical conductors 12), and overmolding a second component material (e.g., the frame 10 material) over portions of the first component 12 and the sealant material 14. The sealant 14 is applied or molded around the first component 12 in a desired shape to assure that desired areas of the first component 12 are acceptably covered and to further assure that the sealant 14 is fully enveloped within the second component (e.g., frame 10) material following overmolding.

As set forth above, it has been found that the heating of the first component 12 and sealant material 14 (by the overmolding), without liquefying the sealant 14, activates the sealant 14 and may, in some instances, foster cross-linking of the sealant 14 material.

It has been found that the present sealant system exhibits exceptional sealing characteristics. For example, it has been found that the present sealant adheres well to the conductors 12 and also adheres well to the overmolded plastic frame 10. In fact, initial testing has shown that a seal formulated according to the principles of the present invention does not fail at 50 psi. No air bubbles were found to leak through an assembly at 50 psi, and no failures were found after thermo-shocking from −30° C. to 150° C. at 40 psi. It should be noted that typical part requirements for the automotive industry are around 5 psi.

All patents referred to herein, are incorporated by reference, whether or not specifically done so within the text of this disclosure.

In the present disclosure, the words “a” or “an” are, where appropriate, to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A method of sealing a juncture of a first component and a second component in which the first component penetrates the second component to eliminate leak paths, comprising the steps of:

providing a first penetrating component;

disposing around a portion of the first penetrating component a sealant material formulated from a first polymer being an ethylene vinyl acetate copolymer in a concentration of about 25 percent to about 40 percent of the sealant material, an inert filler material in a concentration of about 20 percent to about 45 percent of the sealant material, a second polymer being an ethylene polymer other than an ethylene vinyl acetate copolymer in a concentration of about 20 percent to about 35 percent of the sealant material, a hydrocarbon resin in a concentration of about 1 percent to about 15 percent of the sealant material, an epoxy resin present in a concentration of about 2 percent to about 5 percent of the sealant material and an activator present in a concentration of about less than one percent of the sealant material;

overmolding a second, penetrated component material around the first component and the sealant material; and activating the sealant material to form seal between the first component and the second component, wherein the activating step is carried out by heating the sealant material without liquefying the sealant material.

2. The method in accordance with claim 1 wherein the inert filler material is a mineral filler in a concentration of about 25 percent to about 30 percent of the sealant material.

3. The method in accordance with claim 2 wherein the sealant is further formulated with the hydrocarbon resin present in a concentration of about 10 percent to about 15 percent weight of the sealant material.

4. The method in accordance with claim 1 wherein the first component is an electrically conductive component.

5. The method in accordance with claim 1 including a plurality of first components.

6. The method in accordance with claim 1 wherein the second, penetrated component material is polybutylene terephthalate.

7. The method in accordance with claim 1 wherein the second, penetrated component material is nylon.

8. A method of sealing a first component to a second component comprising the steps of:

disposing a premold of sealant material around at least a portion of the first component, such that the premold of sealant is formed into a desired shape; and overmolding the second component over the first component and the premold of sealant material such that the second component substantially surrounds the premold of sealant material, wherein heat from the overmolding step activates the premold of sealant material, without liquefying the premold material, so as to cause the premold of sealant material to form a seal between the first component and the second component, the overmolding step being performed in such a way that although the premold of sealant material is heated up during the overmolding step, the shape of the premold of sealant material is not substantially changed because the second component is formed and configured to substantially surround the premold of sealant material, wherein the sealant material is formulated from first polymer being an ethylene vinyl acetate copolymer in a concentration of about 25 percent to about 40 percent of the sealant material, an inert filler material in a concentration of about 20 percent to about 45 percent of the sealant material, a second polymer being an ethylene polymer other than an ethylene vinyl acetate copolymer in a concentration of about 20 percent to about 35 percent of the sealant material, a hydrocarbon resin in a concentration of about 1 percent to about 15 percent of the sealant material, an epoxy resin present in a concentration of about 2 percent to about 5 percent of the sealant material and an activator present in a concentration of about less than one percent of the sealant material.

9. The method in accordance with claim 8 wherein the first component is an electrically conductive component and the second component is a plastic frame, the first component being adapted to and configured to extend beyond an outer surface of the second component after the second component is overmolded around the first component, the first component and the second component forming an electrical connector assembly for use in automotive components and assemblies.

* * * * *

UNITED STATES PATENT AND TRADEMARK OFFICE

CERTIFICATE OF CORRECTION

PATENT NO. : 7,754,129 B2
APPLICATION NO. : 11/386500
DATED : July 13, 2010
INVENTOR(S) : Lach, III et al.

It is certified that error appears in the above-identified patent and that said Letters Patent is hereby corrected as shown below:

Title Page; item (75);
Under the listing of Inventors, “Jason R. Prancer” is changed to -- Jason R. Pranger --.

Signed and Sealed this
First Day of March, 2011

David J. Kappos
*Director of the United States Patent and Trademark Office*